(12) United States Patent
Edland et al.

(10) Patent No.: US 8,739,660 B2
(45) Date of Patent: *Jun. 3, 2014

(54) SCREW HEAD AND TOOL FOR USE THEREWITH

(75) Inventors: Jone Edland, Olso (NO); David Curtis Goss, Rockford, IL (US)

(73) Assignee: Ttapdrive AS, Kristiansand (NO)

( * ) Notice: Subject to any disclaimer, the term of this patent is extended or adjusted under 35 U.S.C. 154(b) by 654 days.

This patent is subject to a terminal disclaimer.

(21) Appl. No.: 12/762,759

(22) Filed: Apr. 19, 2010

(65) Prior Publication Data

US 2010/0269644 A1    Oct. 28, 2010

Related U.S. Application Data

(63) Continuation-in-part of application No. 11/979,731, filed on Nov. 7, 2007, now Pat. No. 7,730,812, which is a continuation of application No. 11/471,551, filed on Jun. 21, 2006, now abandoned.

(30) Foreign Application Priority Data

Apr. 24, 2006  (GB) ........................ 0608062

(51) Int. Cl.
*B25B 23/00*  (2006.01)
*B25B 15/00*  (2006.01)
*B25B 13/48*  (2006.01)
*B25B 13/06*  (2006.01)

(52) U.S. Cl.
USPC ............. 81/460; 81/436; 81/451; 81/461; 81/121.1

(58) Field of Classification Search
USPC ............... 81/460, 436, 451, 461, 121.1; 411/403–405, 410, 919
See application file for complete search history.

(56) References Cited

U.S. PATENT DOCUMENTS

| 975,285 A | 11/1910 | Robertson |
| 1,797,390 A | 3/1931 | Wood |

(Continued)

FOREIGN PATENT DOCUMENTS

| AT | 195189 | 1/1958 |
| CA | 2280301 A1 | 8/2000 |

(Continued)

OTHER PUBLICATIONS

Norwegian Search Report in Application No. 2010 0558, dated Oct. 19, 2010.

(Continued)

*Primary Examiner* — Monica Carter
*Assistant Examiner* — Danny Hong
(74) *Attorney, Agent, or Firm* — Finnegan, Henderson, Farabow, Garrett & Dunner, L.L.P.

(57) ABSTRACT

Disclosed is a screw head having a slot (2) in the upper surface of the screw head, an upper peripheral wall (9) of hexalobular planform extending down into the screw head, the upper peripheral wall (9) being parallel or near parallel to the axis of the screw, a sloping transition surface (15) extending downwardly and inwardly with respect to the lower edge of the upper peripheral wall (9), and a tapered recess (11) extending downwardly from the lower edge of the sloping transition surface (15), in which the dimensions of the screw head are such that when the screw head is engaged by a tool (6) having upper (16) and lower engagement (17) sections, there is a 'stick fit' between the surface of the tapered recess (11) and the external surface of the lower engagement section (17), and there is no engagement with the sloping transition surface (15).

10 Claims, 6 Drawing Sheets

(56) References Cited

U.S. PATENT DOCUMENTS

| | | |
|---|---|---|
| 2,083,092 A | 6/1937 | Richer |
| 2,216,382 A | 10/1940 | West |
| 2,397,216 A | 3/1946 | Stellin |
| 2,800,829 A | 7/1957 | West |
| 2,800,936 A | 7/1957 | West |
| 3,207,196 A | 9/1965 | Stillwagon, Jr. |
| 3,273,442 A | 9/1966 | Launay |
| 3,463,209 A | 8/1969 | Podolsky |
| 3,584,667 A | 6/1971 | Reiland |
| 3,888,144 A | 6/1975 | Parsons |
| 4,084,478 A | 4/1978 | Simmons |
| 4,258,569 A | 3/1981 | Buchy et al. |
| 4,258,596 A | 3/1981 | Bisbing et al. |
| 4,269,246 A | 5/1981 | Larson et al. |
| 4,325,153 A | 4/1982 | Finnegan |
| 4,338,835 A | 7/1982 | Simons |
| 4,503,737 A | 3/1985 | DiGiovanni |
| 5,137,407 A | 8/1992 | Yamamoto |
| 5,171,117 A | 12/1992 | Seidl |
| 5,279,190 A | 1/1994 | Goss et al. |
| 5,370,021 A | 12/1994 | Shigematsu |
| 5,553,983 A | 9/1996 | Shinjo |
| 6,016,727 A | 1/2000 | Morgan |
| 6,017,177 A | 1/2000 | Lanham |
| 6,253,649 B1 | 7/2001 | Shinjo |
| 6,419,489 B1 | 7/2002 | Jörnéus et al. |
| 6,679,141 B1 | 1/2004 | Bozonnet et al. |
| 6,792,838 B2 | 9/2004 | Brooks et al. |
| 6,948,408 B1 | 9/2005 | Lee |
| 6,951,158 B1 | 10/2005 | Edland |
| 7,147,421 B2 | 12/2006 | Suzuki |
| 7,730,812 B2 * | 6/2010 | Edland .......................... 81/460 |
| 2002/0129680 A1 | 9/2002 | Holland-Letz |
| 2005/0172761 A1 | 8/2005 | Brooks |
| 2005/0172762 A1 | 8/2005 | Suzuki |

FOREIGN PATENT DOCUMENTS

| | | |
|---|---|---|
| CN | 1384903 A | 11/2002 |
| DE | U-1866754 | 1/1964 |
| DE | 4413782 A1 | 9/1994 |
| DE | 19836572 A1 | 4/1999 |
| DE | 10 2005 011 734 A1 | 9/2006 |
| EP | 0257664 A1 | 3/1998 |
| EP | 0933538 A1 | 8/1999 |
| EP | 0961042 A1 | 12/1999 |
| EP | 1039151 B1 | 9/2000 |
| EP | 1230489 B1 | 8/2007 |
| GB | 813571 | 5/1959 |
| GB | 1150382 | 4/1969 |
| GB | 2261483 | 5/1993 |
| GB | 2329947 A | 4/1999 |
| JP | 51-058256 | 5/1976 |
| NO | 128968 | 2/1974 |
| TW | 61188 | 9/1984 |
| TW | M271972 | 8/2005 |
| TW | M271974 | 8/2005 |
| TW | M282788 | 12/2005 |
| WO | WO 01/27479 A1 | 4/2001 |
| WO | WO 2007/022293 A1 | 2/2007 |
| WO | WO 2007/123409 A1 | 11/2007 |

OTHER PUBLICATIONS

International-Type Search Report from the European Patent Office for Norwegian Application No. 2010 0558, dated Nov. 24, 2010.

Japanese Patent Office, First Office Action in Japanese Patent Application No. 2009-507612 (2 pages).

Office Action from the Canadian Intellectual Property Office dated Apr. 10, 2013 in Canadian Application No. 2,650,312, 3 pages.

The Patent Office of the State Intellectual Property Office of the People's Republic of China, The First Office Action for Application No. 200680054351.4, Feb. 12, 2010.

The International Organization for Standardization, ISO 10664, 1999.

DIN 6912.

DIN 6911.

Dr. Solf & Zapf, Filing from Opposition Proceeding in EP 1230489 B1, 2008.

Taiwanese Patent Office, Search Report for Taiwan Invention Patent Application Patent Application No. 2004-549533.

International Search Report and Written Opinion in PCT/NO2011/000128, mailed Aug. 10, 2011, 8 pages.

Search Report in Norwegian application No. 20100558, dated Nov. 2, 2013, 2 pages.

* cited by examiner

SCREW HEAD AND TOOL FOR USE THEREWITH

RELATED APPLICATIONS

This application is a continuation-in-part of U.S. application Ser. No. 11/979,731 filed Nov. 7, 2007 now U.S. Pat. No. 7,730,812, which is a continuation of U.S. application Ser. No. 11/471,551 filed Jun. 21, 2006 now abandoned, which claims priority of United Kingdom Application No. 0608062.6 filed Apr. 24, 2006, the contents of all of which are incorporated herein by reference.

TECHNICAL FIELD

The invention relates to a screw head having a slot in its upper surface with a recess disposed inwardly of the slot, to a tool for use with this screw head, and to a system comprising a screw head and a tool for use therewith.

BACKGROUND

The background to this technology is described in our U.S. Pat. No. 6,951,158, and will not be repeated here. U.S. Pat. No. 6,951,158 showed a tool to engage a screw head. This configuration had advantages in that it restricted the screw from wobbling, and prevented the driving bit from camming out of the screw recess. However, the tool and screw head could not interact so that the screw was 'stick-fit' and retained on the tool without the possibility of falling off. The tool engaged the screw head within a hexalobular slot with surfaces that were directly parallel to each other.

SUMMARY

In one aspect, there is provided a screw head having a hexalobular slot in the upper surface of the screw head, an upper peripheral wall of hexalobular planform extending down into the screw head, the upper peripheral wall being parallel or near parallel to the axis of the screw, a sloping transition surface extending downwardly and inwardly with respect to the lower edge of the upper peripheral wall, and a tapered recess extending downwardly from the lower edge of the sloping transition surface, in which the dimensions of the screw head are such that when the screw head is engaged by a tool having upper and lower engagement sections, there is a 'stick fit' (i.e., an interference fit) between the surface of the tapered recess and the external surface of the lower engagement section, and there is no engagement with the sloping transition surface.

It is preferred that the tapered recess is of circular planform.

It is also preferred that there is a close fit at the upper edge of the upper peripheral wall and a loose fit at the lower edge of the upper peripheral wall with upper engagement section.

In another aspect, the invention provides a tool for use with a screw head having a hexalobular slot in its upper surface, and according to the above description, in which the tool has upper and lower engagement sections, and the lower engagement section is of smaller diameter is and tapered downwardly with respect to the axis of the screw to which the tool is to engage, and in which the upper and lower engagement sections are connected with a transition surface which is tapered with a large angle with respect to the axis of the screw.

It is preferred that the upper engagement section is tapered downwardly at an angle with respect to the axis of a screw to which the tool is to engage.

It is further preferred that the upper engagement section is tapered at an angle of 0.1 to 5 degrees.

It is still further preferred that the upper engagement section is tapered at an angle of between 1 and 2 degrees.

In yet another aspect, there is provided a system comprising a screw head having a hexalobular slot in its upper surface and a tool for use with the screw head, in which in a lower engagement section of the tool, the tool is tapered at the same angle as a recess in the screw, so that the tool can make a 'stick fit' connection with the screw.

It is preferred that there is a transition zone between the upper and lower engagement sections of the tool in which the tool makes no contact with the screw.

It is also preferred that in an upper engagement section of the tool, the tool is tapered at a sharper angle than a peripheral wall of the screw.

BRIEF DESCRIPTION OF THE DRAWINGS

Specific embodiments of the invention will now be described by way of example with reference to the accompanying drawings, in which:—

DESCRIPTION OF A SPECIFIC EMBODIMENT

Figure 1:
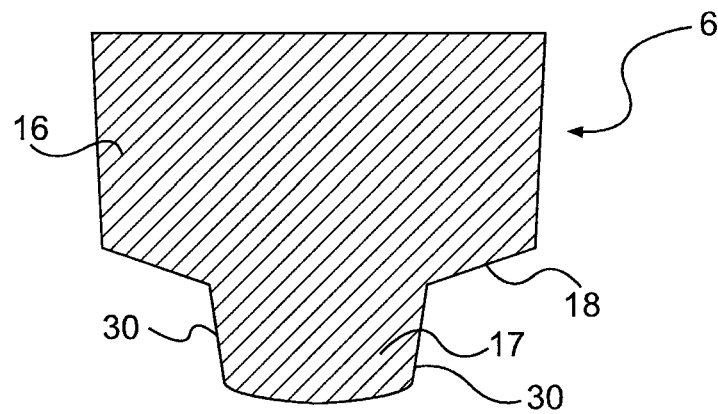
FIG. 1 is a cross section of one embodiment of a driving tool.

As shown in FIGS. 2, 5, 7, and 10, a screw head 1 has a slot 2. The slot 2 is formed as a recess 3 in the screw head, and is shaped as a star with six points 4. The points 4 of the star are rounded, as shown in FIG. 3, and the slot 2 is termed a hexalobular slot. As used herein, the terms "rounded" and "round" are not limited to shapes having a constant radius of curvature but refer to any curved shape, including elliptical or other curved shapes. Hexalobular slots are described in ISO 10664, and are an internal driving feature. They may be known as 'teeth recesses' or 'star recesses'. Depending on the direction of rotation, a tool 6 (see FIGS. 1-3) will engage surfaces 7 or 8 on one side or the other of each point 4.

Figure 2:
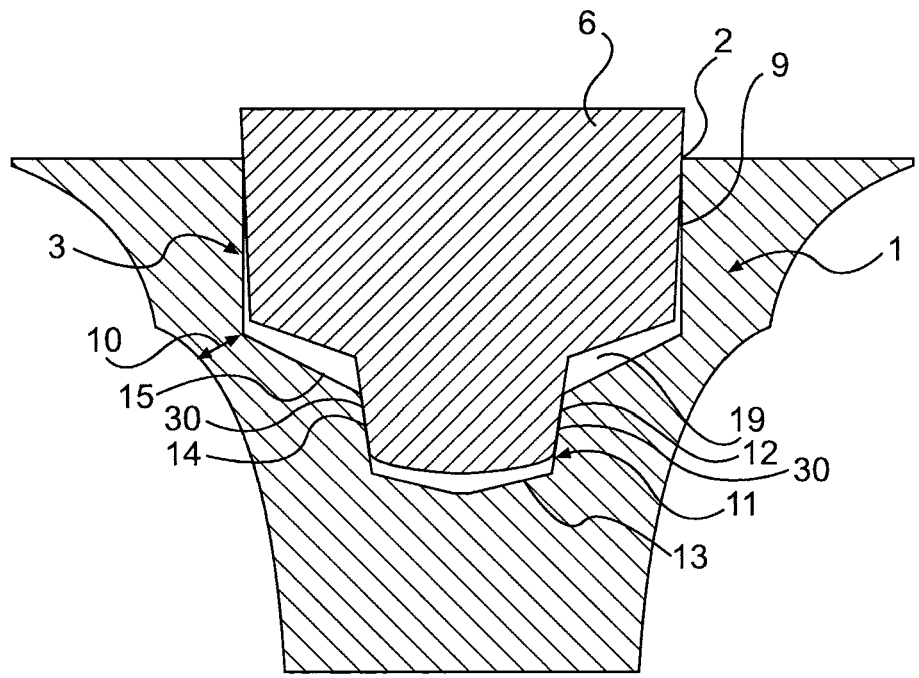
FIG. 2 is a cross section of the tool of FIG. 1 engaging the head of a screw.
Figure 3:
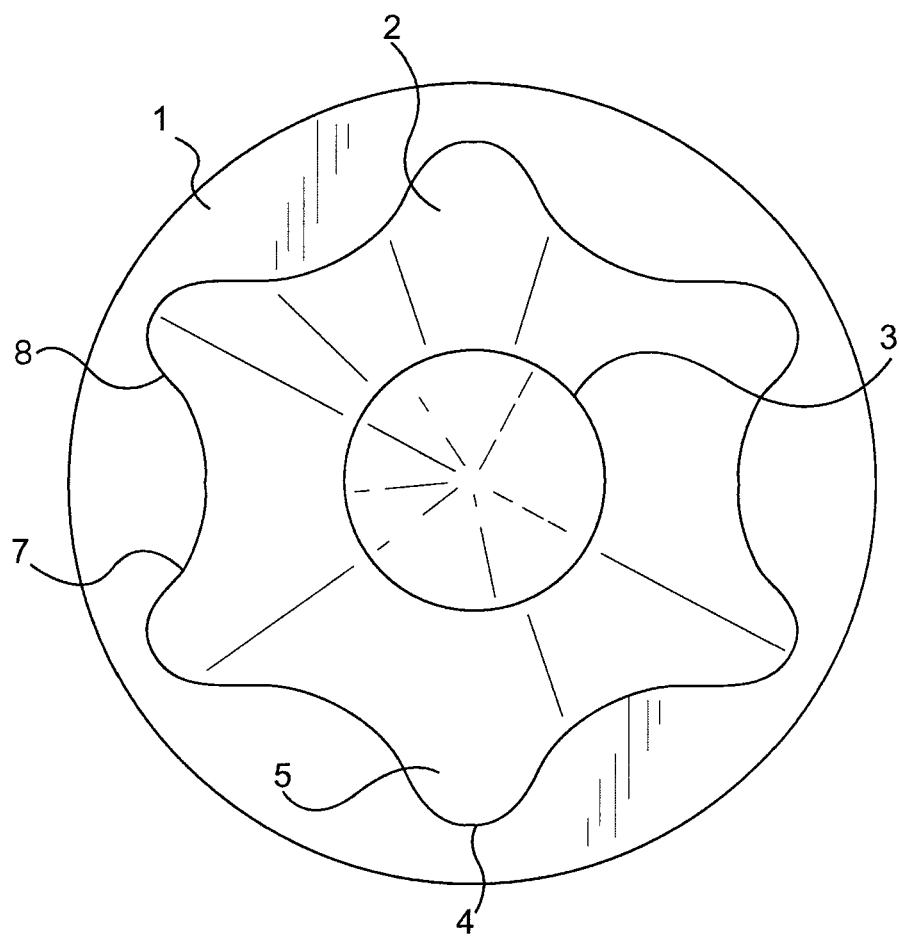
FIG. 3 is a plan view of the screw head showing the configuration of a slot.
Figure 4:
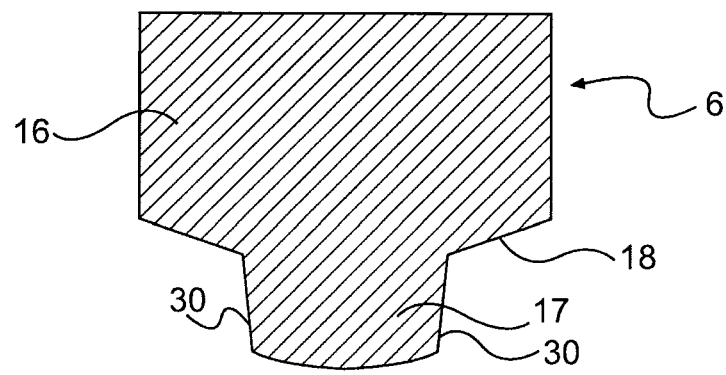
FIG. 4 is a cross section of another embodiment of a driving tool.

FIG. 2 shows a cross section through one embodiment of the screw head 1. The recess 3 extends down into the screw head 1. Walls 9 of the recess 3 are approximately straight. The cross section of the recess 3 retains the shape of a star with six points throughout the straight walled part as it extends down into the screw head. The depth of the recess 3 is limited by the minimum allowable wall thickness 10 near the bottom of the recess 3.

As shown in FIGS. 2, 5, 7, and 10, the slot 2 has a further recess 11 at the bottom of the six pointed recess 3. The recess 11 is aligned with the axis of the screw, and so is centrally located therein. This central recess 11 may have a circular cross section and a smaller diameter than the recess 3. Walls 12 of the recess 11 are slightly inclined, so that the bottom 13 of the recess 11 has a diameter slightly smaller than that of the upper part 14 of the recess 11.

Figure 5:
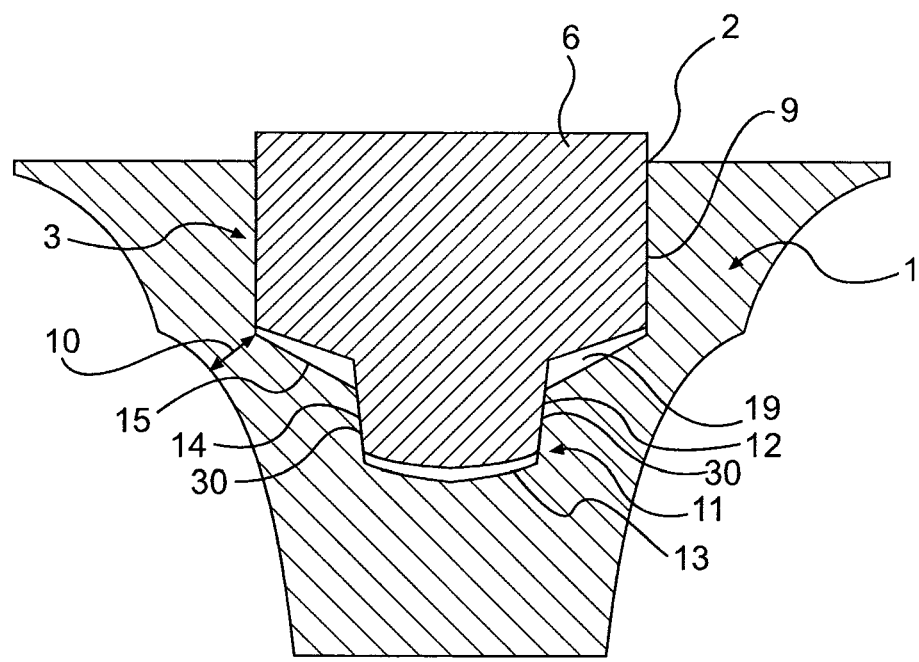
FIG. 5 is a cross section of the tool of FIG. 4 engaging the head of a screw.
Figure 7:
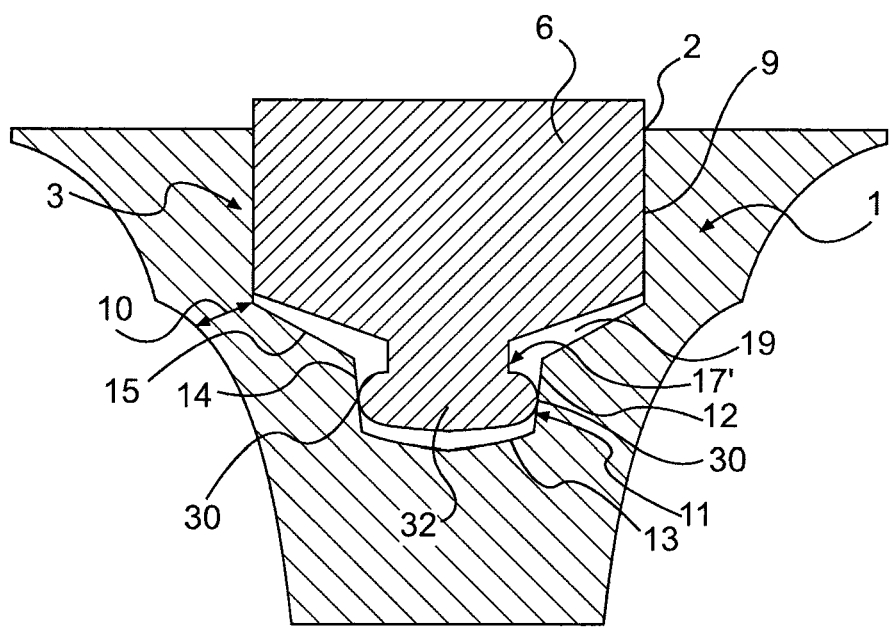
FIG. 7 is a cross section of the tool of FIG. 6 engaging the head of a screw.
Figure 10:
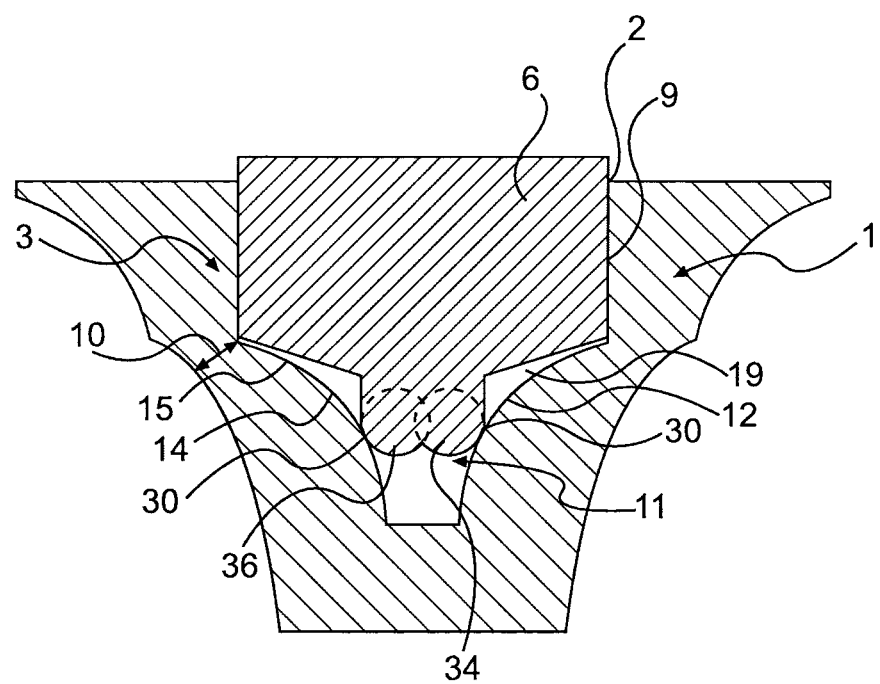
FIG. 10 is a cross section of another embodiment of a driving tool engaging another embodiment of a screw.

The walls 12 of the recess 11 may have various shapes. For example, within an axial cross-section of the screw head 1, the walls 12 may extend in substantially straight lines, as shown in FIGS. 2, 5, and 7. As another example, the walls 12 may extend at different angles at different points along the axis of the screw head 1, as shown in FIG. 10. In some such cases, the walls 12 may have a convex shape and extend away from the axis of the screw head 1 as they extend upwardly. For example, as FIG. 10 shows, the walls 12 may include one or more curved portions that extend away from the axis of the screw head 1 as they extend upward. In embodiments where the walls 12 include on or more curved portions, those portions may have a constant or varying radius of curvature.

The configuration of the walls 12 of the tapered recess 11 is not limited to the examples provided in the Figures. For instance, as an alternative to one or more curved, convex portions extending away from the axis of the screw head as they extend upward, the walls 12 of the tapered recess 11 may include one or more polygonal portions that extend at an increasing angle to the axis of the screw head as they extend upward. Indeed, the walls 12 of the tapered recess may have any combination of straight, curved, and/or polygonal portions that allow an interference fit with the tool 6, as discussed in more detail below.

A downwardly straight or sloping transition surface 15 is formed between the upper part 14 of the central recess 11 and the walls 9 of the six-pointed recess 3.

The tool 6 has an engagement section 16 that is designed to fit within the recess 3. The shape of the engagement section 16 in plan complements the shape of the recess 3. However, the diameter of the engagement section 16 may be uniform (as shown in FIGS. 4-7) or slightly tapered inwardly towards its lower end (as shown in FIGS. 1 and 2). The taper may typically be 1.5 degrees. The diameter of the engagement section 16 is sized to allow it to be inserted into the recess 3 without difficulties.

The tool 6 also has a central point, or lower engagement section, 17, which may have a circular cross section. A surface 18 on the tool 6 extends outwardly and upwardly from the central point 17 to the engagement section 16. The angle of inclination of the surface 18 is smaller than that of the transition surface 15. Thus a space 19 is formed between the surfaces 15 and 18 when a tool 6 is inserted into the slot 2. The depth of the space 19 diverges towards the central point 17. The section 16 of the tool 6 may engage the upper periphery of the walls 9 of the recess 3 when the tool enters the slot 2.

Furthermore, in the case of screws which have undergone surface treatment, the diverging space 19 allows any excess coating to collect in the space 19 without obstructing the engagement between the tool and the slot. If no space had been provided, coating residue might settle on the surface 15 and at the bottom 13 of the recess 11, and thereby prevent sufficient engagement between the tool 6 and the slot 2.

Press engagement between the central point 17 and the recess 11, supported by the engagement section 16 of the tool and the upper periphery of the wall 9, ensures that—due to friction—the screw can remain (i.e. 'stick fit') on the tool without falling off. This mode of engagement is particularly effective in reducing angular movement between the tool 6 and the screw head 1. Retention of the screw on the tool by press engagement is particularly useful on one handed power tools and for robotic tools.

To provide an interference fit between the central point 17 and the tapered recess 11, one or more portions of the central point 17 may have a cross-sectional dimension wider than the narrowest portion of the tapered recess 11 and narrower than the widest portion of the tapered recess 11. As a result, one or more contact surfaces 30 of an external surface of central point 17 may provide an interference fit with the tapered recess 11 where the contact surface 30 presses against the surface of the tapered recess 11. The contact surfaces 30 of the central point 17 may have various shapes. For example, as FIGS. 1, 2, 4, and 5 show, within an axial cross-section of central point 17, contact surfaces 30 may have straight sides, which may taper toward one another as they extend downward. In some embodiments, these straight sides may have substantially the same taper as the surface of the tapered recess 11.

Alternatively, different portions of the contact surfaces 30 may extend at different angles relative to the axis of the tool 6 and the screw head 1. For example, as FIG. 6-9 show, the contact surfaces 30 may include one or more curved portions within an axial cross-section of the central point 17. The one or more curved portions of each contact surface 30 may have a convex shape that extends at an increasingly greater angle to the axis of the tool and the screw head as it extends downwardly. For instance, contact surfaces 30 may include convex curved portions that curve toward the axis of the tool 6 and the screw head 11 as they extend downward.

Configuring the contact surfaces 30 and/or the walls 12 of the tapered recess 11 with a shape having different angles at different axial points, such as a curved surface, may allow the contact surfaces 30 to substantially match any of a plurality of angles that the surface of the tapered recess 11 may have at the point of the interference fit. Indeed, configuring the contact surfaces 30 and/or the walls 12 of the tapered recess 11 with a curved cross-section may allow the contact surfaces 30 to automatically substantially match whatever angle the corresponding portion of the surface of the tapered recess 11 may have at the point of interference fit between the contact surfaces 30 and the surface of the tapered recess 11. With the contact surfaces 30 and/or the walls 12 of the tapered recess 11 having convex, curved shapes, contact between the contact surfaces 30 and the walls 12 of the tapered recess 11 will automatically occur wherever the two surfaces are tangent to one another. Thus, at the point of the interference fit, the contact surfaces 30 will extend parallel to the abutting portion of the walls 12 of the tapered recess 11, regardless of the angle of the contact surfaces 30 or the walls 12.

Figure 6:
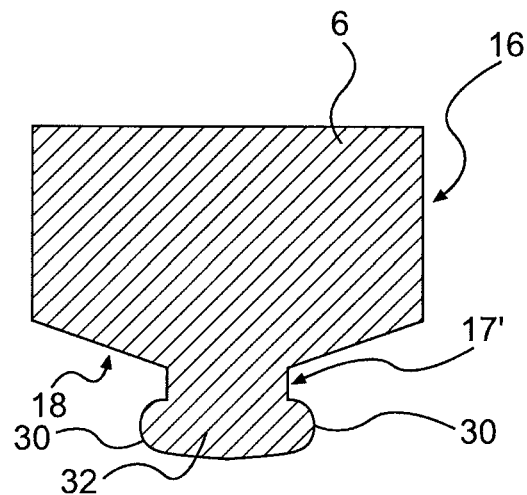
FIG. 6 is a cross section of another embodiment of a driving tool.
Figure 8:
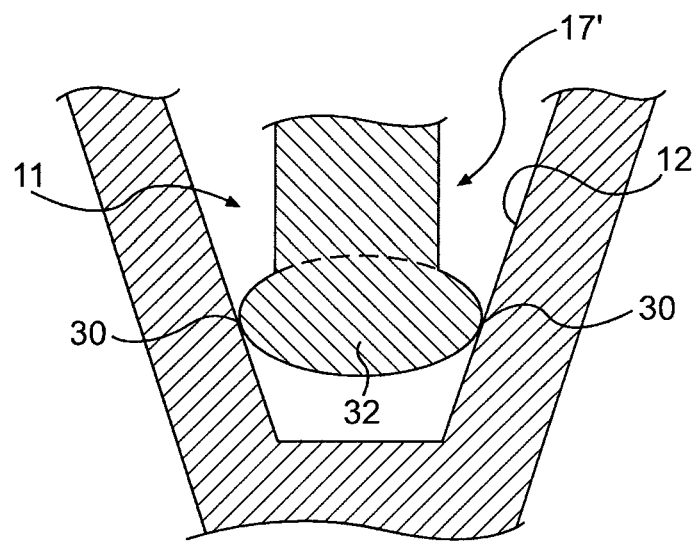
FIG. 8 shows a central point of another embodiment of a driving tool engaged in a tapered recess of the head of a screw.
Figure 9:
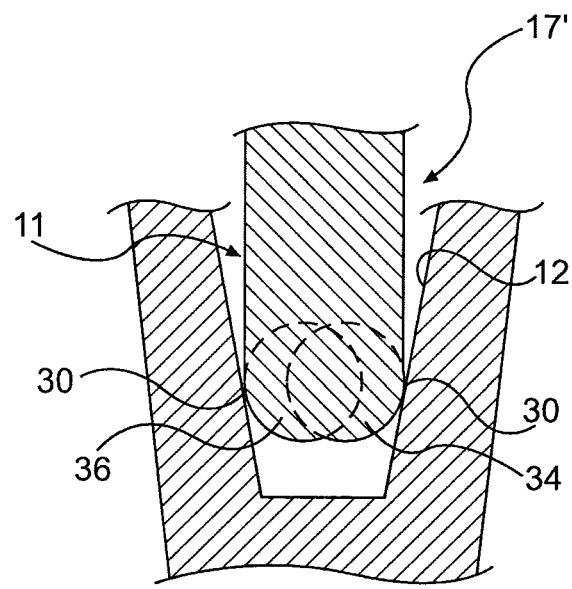
FIG. 9 shows a central point of another embodiment of a driving tool engaged in a tapered recess of the head of a screw.

Embodiments of the tool 6 where the contact surface 30 includes one or more curved portions may have various forms. As shown in FIGS. 6-8, the central point 17 may include a single, curved bulb 32 with curved contact surfaces 30 on each side. As another example, FIG. 9 and show that the central point 17 may include multiple curved bulbs 34, 36, each defining curved contact surfaces 30. A curved portion of a contact surface 30 may have a substantially constant radius of curvature, as shown in FIG. 9, or it may have a varying radius of curvature, as shown in FIG. 8. Indeed, curved portions of contact surfaces 30 may include one or more circular shapes, elliptical shapes, or segments of such shapes. The remainder of the central point 17 may have any shape, including, but not limited to, tapered, non-tapered, and/or non-circular (in its cross-section perpendicular to the central axis of tool 6).

The configuration of the central point 17 and the contact surfaces 30 are not limited to the examples provided in the Figures. The central point 17 and the surfaces thereof, including the contact surfaces 30, may be smooth, uneven (rough), fluted (grooved), and/or any other shape and/or textures. The contact surfaces 30 may have any arrangement of shapes that allow it to engage with the surface of the tapered recess 11. For instance, as an alternative to a curved portion, a contact surface 30 may have a portion with a polygonal cross-section that extends toward the axis of the tool 6 as it extends downwardly. Similar to a curved portion, such a polygonal portion may allow the contact surface to match any of a plurality of different angles that the surface of the tapered recess 11 may have at the point of the interference fit. Furthermore, in the case of straight-side contact surfaces 30, the contact surfaces 30 may extend at angle(s) different from the angle of the surface of the tapered recess 11.

Additionally, a system according to the present disclosure may employ different combinations of shapes of the contact surfaces 30 of the central point 17 and the walls 12 of the tapered recess 11 than shown in the Figures. For example, a system according to the present disclosure may employ a central point 17 with contact surfaces 30 that are substantially straight with walls 12 of the tapered recess 11 that include curved and/or polygonal portions.

The central point 17 may have a length shorter than the height of the recess 3, to enable the engagement section 16 of the tool 6 to enter the recess 3.

ADVANTAGES

The formation of a conical press connection between the tool 6 and the screw head 1 enables the screw to remain on the tool, and not fall off. This advantage is in addition to the feature of our U.S. Pat. No. 6,951,158 that restricted 'wobbling' of the screw. Force fit of the tool 6 onto the screw head 1 keeps the screw head on the tool. The material of the tool 6 is harder than the material of the screw head 1, and this enables the force fit connection to take place.

Additionally, configuring the contact surfaces 30 and/or the walls 12 of the tapered recess 11 with a cross-section that has different angles at different axial positions, such as with one or more curved portions, may provide a cost-effective way to ensure secure engagement of the tool 6 to the screw head 1. By allowing the contact surfaces 30 to automatically match the angle of the tapered recess 11 at the point of the interference fit, such a configuration may ensure desirably high friction between the contact surfaces 30 of the central point 17 and the walls 12 of the tapered recess 11. This result may occur because surfaces extending at substantially the same angle where they abut may tend to produce greater friction than surfaces extending at significantly different angles where they abut. This may promote good adherence of the screw head 1 to the tool 6. Because the disclosed embodiments enable this result for a variety of angles that the contact surfaces 30 of the central point 17 and/or the walls 12 of the tapered recess 11 may have, they reduce the need to hold tight manufacturing tolerances on the shapes of these surfaces.

Additionally, configuring the contact surfaces 30 with one or more convex portions that extend at increasingly greater angles to the axis of the tool 6 as they extend downward may tend to reduce variability in the depth of engagement of the central point 17 in the tapered recess 11. Configuring the walls 12 of the tapered recess 11 with one or more convex portions that extend away from the central axis of the screw head 1 as they extend upward may also promote this result. This may help ensure that the tool 6 properly engages the screw head 1 to allow robust transfer of torque between the tool 6 and the screw head 1.

The invention claimed is:

1. A system for driving a screw, comprising:
a screw; and
a corresponding tool,
wherein the screw includes a screw head comprising:
a hexalobular slot in the upper surface of the screw head,
an upper peripheral wall of hexalobular planform extending down into the screw head, the upper peripheral wall being parallel or near parallel to the axis of the screw,
a sloping transition surface extending downwardly and inwardly with respect to the lower edge of the upper peripheral wall, and
a tapered recess extending downwardly from the lower edge of the sloping transition surface, and
wherein the dimensions of the screw head are such that when the screw head is engaged by the tool, which has upper and lower engagement sections and in which the upper engagement section fits within a recess formed in the hexalobular slot, there is an interference fit between the surface of the tapered recess and the external surface of the lower engagement section, and there is no engagement with the sloping transition surface.

2. The system of claim 1, wherein the upper engagement section comprises a uniform diameter.

3. The system of claim 2, wherein the upper engagement section is tapered downwardly at an angle with respect to the axis of the screw.

4. The system of claim 3, in which in the lower engagement section of the tool, the tool is tapered at the same angle as the recess in the screw, so that the tool makes an interference fit press connection with the screw.

5. The system of 4, in which there is a transition zone between the upper and lower engagement sections of the tool in which the tool makes no contact with the screw.

6. The system of claim 5, in which in the upper engagement section of the tool, the tool is tapered at a sharper angle than the peripheral wall of the screw.

7. The system of claim 6, in which the tapered recess is of circular planform.

8. The system of claim 7, in which there is a closer fit at the upper edge of the upper peripheral wall than a fit at the lower edge of the upper peripheral wall with the upper engagement section.

9. The system of claim 1, wherein the external surface of the lower engagement section has a shape which substantially matches any of a plurality of angular inclinations the surface of the tapered recess may have where the interference fit occurs between the external surface of the lower engagement section and the surface of the tapered recess.

10. The system of claim 1, wherein within an axial cross-section of the tool, the external surface of the lower engagement portion has a first curved portion where the interference fit occurs between the external surface of the lower engagement section and the surface of the tapered recess.

* * * * *